Oct. 27, 1953

J. T. MURPHY 2,656,951

PLANTER UNIT

Filed March 19, 1948

INVENTOR.
JOHN T. MURPHY

ATTORNEYS

Oct. 27, 1953  J. T. MURPHY  2,656,951
PLANTER UNIT
Filed March 19, 1948  3 Sheets-Sheet 3

INVENTOR.
JOHN T. MURPHY
BY
ATTORNEYS

Patented Oct. 27, 1953

2,656,951

UNITED STATES PATENT OFFICE 2,656,951

PLANTER UNIT

John T. Murphy, Brownsville, Tenn., assignor to Harry Ferguson, Inc., Detroit, Mich., a corporation of Delaware Application March 19, 1948, Serial No. 15,929

2 Claims. (Cl. 222—9)

The present invention pertains generally to planter units and more particularly to a rotary seed dispensing mechanism for a planter unit of the basic type illustrated in the patent application of Harold V. Hansen, Serial No. 643,628, filed January 26, 1946. It should be appreciated, however, that while the invention is particularly well adapted for use with a planter unit of this character, such use is by no means an exclusive one.

One of the objects of the invention is to provide a planter unit having an improved drive for the seed dispensing mechanism wherein frictional engagement between the moving parts will be held to a minimm.

Another object is to provide a planter unit of the above character having a precisely centered seed plate driving arrangement which may be readily disassembled and reassembled without disrupting the centering of such arrangement.

A further object is to provide a planter unit of the type set forth and having a seed plate drive which will be susceptible of both simple and economical manufacture.

Other objects and advantages will become apparent as the following detailed description proceeds, taken in connection with the accompanying drawings wherein.

Figure 1:
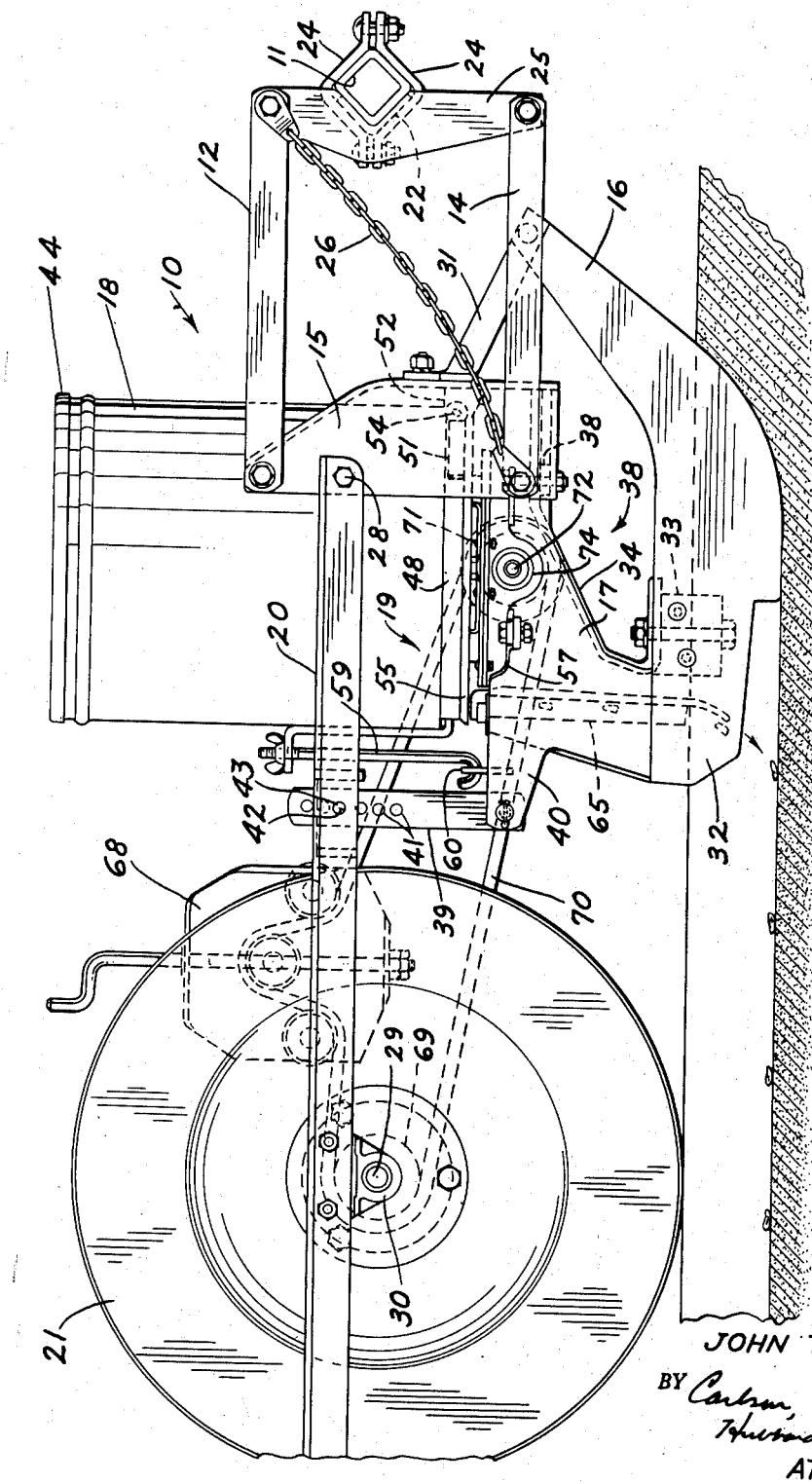
Figure 1 is a side elevational view of a planter unit embodying the present invention, such unit being in a lowered or working position.

While the invention is susceptible of various modifications and alternative constructions, a preferred embodiment has been shown in the drawings and will be herein described in some details, but it is to be understood that there is no intention to limit the invention to the specific form disclosed, the intention being, on the contrary, to cover all modifications and alternative constructions falling within the spirit and scope of the invention as expressed in the appended claims.

Referring more specifically to the drawings, a planter unit 10 constituting an illustrative embodiment of the invention is there shown in trailed relation to a transverse drawbar 11 which may be attached to a towing vehicle by means of any appropriate hitch linkage. Through the use of one or more pairs of vertically spaced parallel links 12 and 14 the unit 10 is permitted to floatingly trail behind the drawbar 11. Pivotally attached to the trailing ends of the links 12, 14 is a winged apron plate 15. Associated with the latter and fixed thereto as a rigid unit are a furrow opener 16, a boot 17 and a seed hopper 18, together with a rotary seed dispensing mechanism 19. Trailingly secured to the apron 15 by means of a U-frame 20 is a press wheel 21. In addition to its normal function of covering the seeds in the furrow made by the planter, the wheel 21 is also utilized as a gaging means for regulating the depth of planting and as a source of power for driving the seed dispensing mechanism.

The connection between the parallel links 12, 14 and the drawbar 11 may be made in any convenient manner. In the present instance, this is accomplished through the use of a transversely disposed structural bar 22 which is maintained in rigid abutment against the drawbar 11 by a pair of clamping straps 24. Arranged in axially spaced relationship along the bar 22 and rigidly fixed thereto are a pair of upright brackets 25, the links 12 and 14 being pivotally attached to the respective extremities of the former.

With the connections described between the brackets 25, the links 12, 14 and the apron 15, it will be noted that a parallelogram type coupling has been provided between the unit 10 and the drawbar 11, such coupling inherently permitting a certain degree of vertical float of the unit. However, in the event that it be desired to elevate the planter unit to a transport position by the expedient of elevating the drawbar 11, the parallelogram coupling would droop downwardly from the drawbar making it impossible to lift the unit clear of the ground with a reasonable elevation of the drawbar. To eliminate such downward droop and thereby resolve this difficulty, the opposite corners of the parallelogram are connected by a check chain 26 having a limited amount of slack.

Pivotally attached as at 28 and extending rearwardly from the apron 15 is the U-frame 20 for the press wheel 21 which is journaled on the former by means of a transversely disposed stub shaft 29 and depending bearings 30. Although the frame 20 is capable of pivotal movement with respect to the apron 15, such movement is normally precluded, being available for adjustment purposes only.

Figure 2:
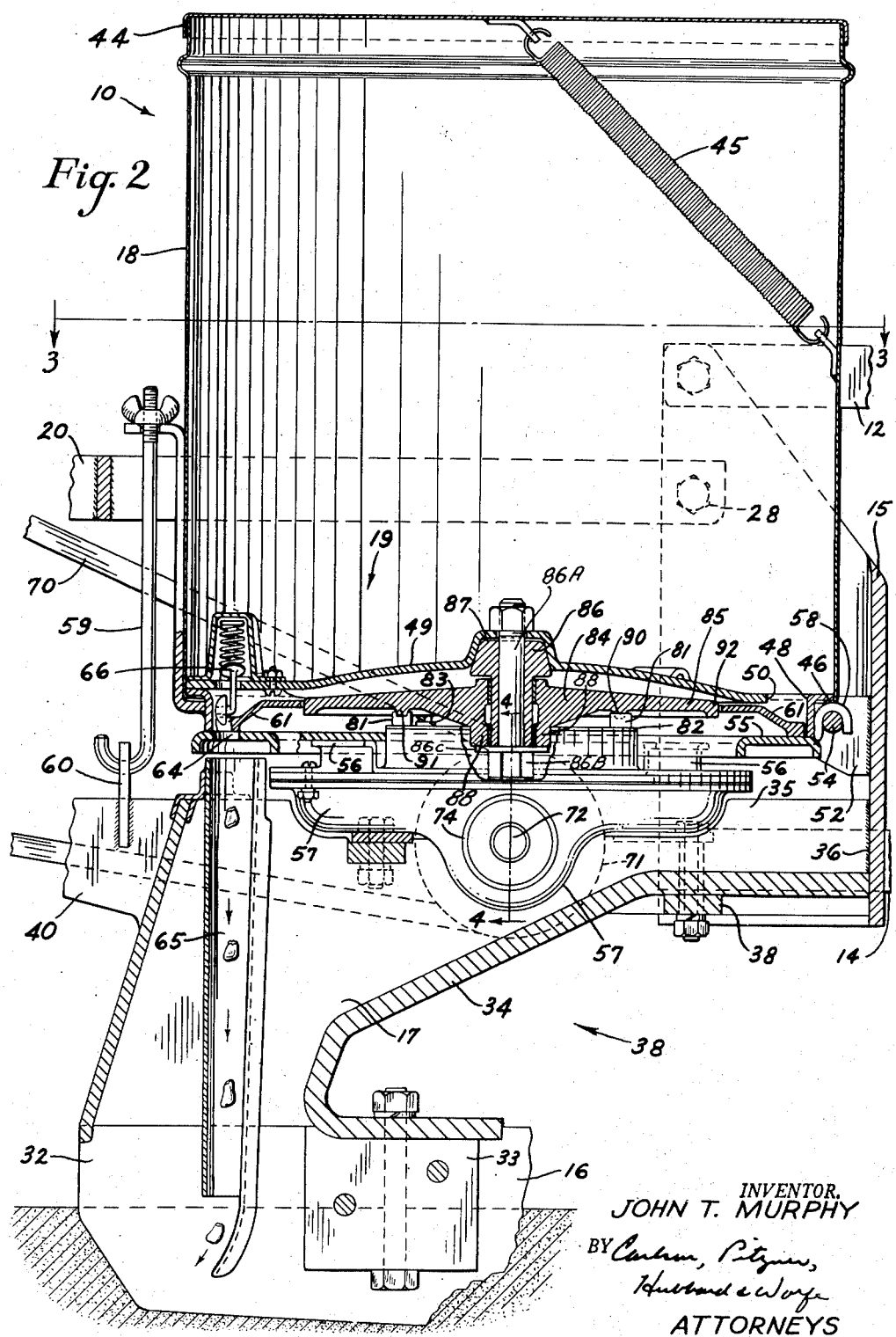
Fig. 2 is an enlarged fragmentary longitudinal sectional view through the planter unit of Fig. 1, taken in the plane of the line 2—2 in Fig. 3, with the central portion of the driving gear and its housing broken away to show details of the intermediate drive member and its relationship to the gear.

The furrow opener 16 is of the conventional runner type having an upwardly curved forward portion rigidly connected to the apron 15 as by means of a pair of rearwardly diverging arms 31. The opener increases in width rearwardly, finally terminating in a pair of spaced-apart winged portions 32 spanned by a suitable reinforcing bracket 33. Overlying the rearward portion of the opener 16 and rigidly secured to the bracket 33 is the boot 17 which, as shown in Figs. 1 and 2, comprises a hollow upstanding casting for supporting and housing the seed dispensing mechanism 19. The boot casting has an inclined front wall 34 which extends forwardly and into abutment with the rearward side of the apron 15. The casting also has spaced-apart side walls 35 which similarly abut the apron, being rigidly attached thereto as by suitable welds 36. By way of further reinforcement, the boot 17 is also bolted to a transverse bar 38 which spans the winged portions of the apron.

The use of the foregoing arrangement permits the apron 15, the opener 16, and the boot 17 to be maintained together as a unitary assembly 38. Furthermore, such assembly is susceptible of rockable adjustment about the pivot points 28 and with respect to the press wheel frame 20 in order to vary the working depth at which the planter unit will operate. Means for making this adjustment is provided in the form of an upright link 39 (see Fig. 1) carried by a pair of laterally spaced brackets 40 extending rearwardly from the boot 17. The link 39 is fashioned with a series of longitudinally spaced holes 41 each adapted to register selectively with a pair of comparable holes 42 in the frame 20. Upon registration of a selected one of the holes 41 with the holes 42, the insertion therethrough of a locking pin 43 will maintain the desired adjustment between the frame 20 and the unitary assembly 38. As an incident to such adjustment, the unitary assembly 38 will move in a generally vertical direction, the frame 20 merely rocking up or down upon the axis of the press wheel shaft 29.

For the purpose of storing a quantity of seed in the planter unit 10, the latter is equipped with a hopper 18 in the form of a cylindrical drum having a detachable cover 44 resiliently maintained in place as by the use of a tension spring 45. At its lower end, the hopper 18 is formed with an inturned circumferential flange 46 to which is rigidly fixed a border ring 48 of inverted L-shaped cross section (refer to Fig. 1). The transverse bottom 49 of the hopper is a convex spider-like, support member having a series of radially extending mounting lugs 49a for attachment to the border ring 48. Due to the contour of its peripheral edges, the bottom 49 when installed in the hopper is surrounded by a series of segmental marginal openings 50 between such edges and the inner circumferential surface of the border ring 48.

Figure 3:
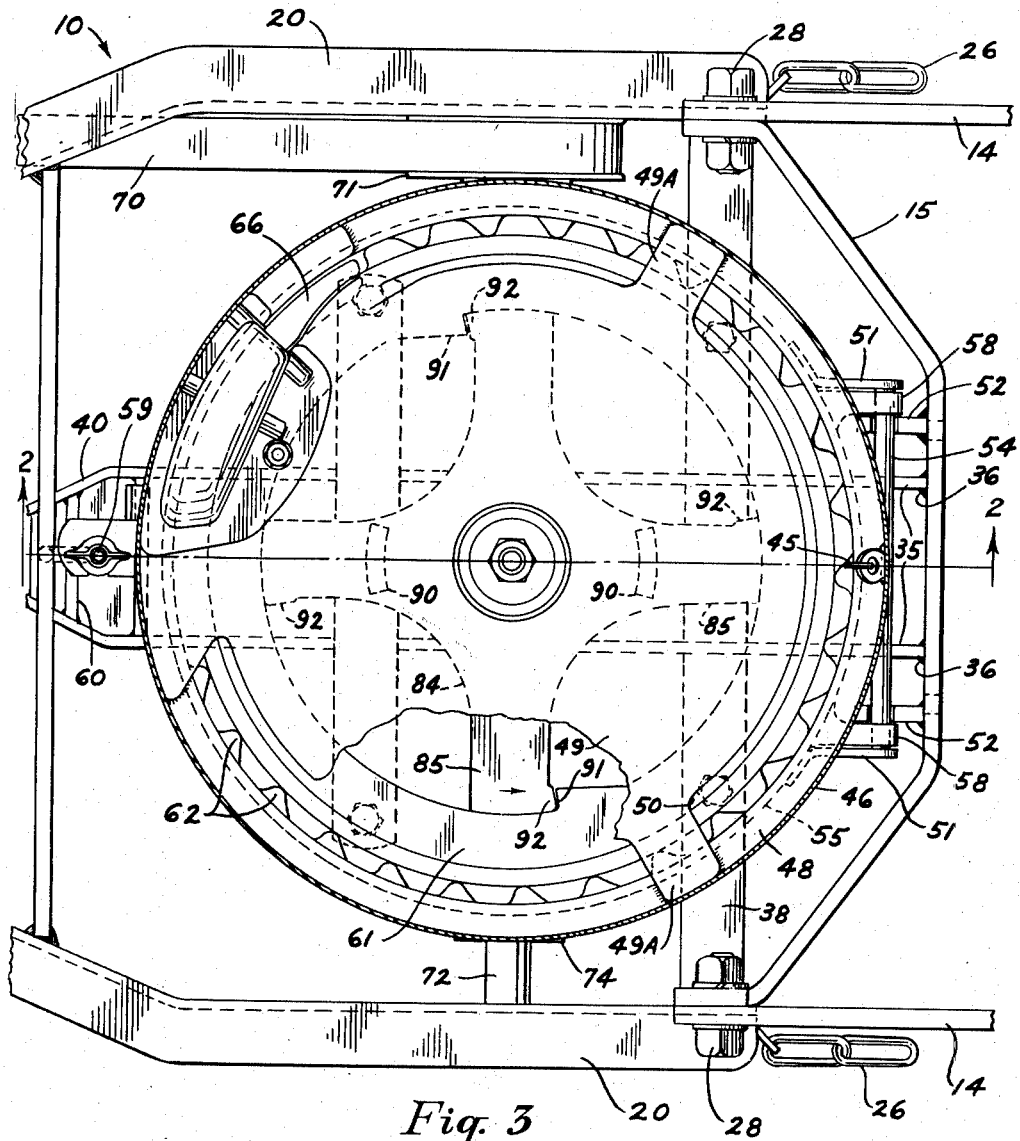
Fig. 3 is an enlarged fragmentary horizontal sectional view through the seed hopper, taken in the plane of the line 3—3 in Fig. 2 and showing in plan a portion of the drive for the seed dispensing mechanism.

In order to detachably secure the hopper 18 to the apron 15, an appropriate hinge connection is provided. Referring more specifically to Fig. 3, it will be observed that a pair of spaced apart parallel brackets 51 are fixed to the hopper border ring 48. Projecting rearwardly from the apron 15 and unitary therewith are a pair of supporting brackets 52 spaced somewhat closer together than the brackets 51. Each set of brackets 52 is formed with a pair of upwardly and outwardly facing slots which are adapted detachably to receive a suitable hinge pin 54 carried by brackets 51. With the latter in place, the hopper 18 may readily be rocked upon a transverse, substantially horizontal axis to separate the driven mechanism on the hopper from the locating and drive mechanism on the gear case and permit the hopper to be lifted away.

A suitable seating surface for the hopper 18 is obtained through the use of an annular false plate 55 which may conveniently be fashioned from a simple sheet metal stamping. The plate 55, in turn, seats upon a series of upstanding ears 56 unitary with a gear case 57 in the dispensing mechanism drive. The plate 55 also derives some support from a pair of spaced-apart hooks 58 unitary therewith and arranged to overlie the hinge pin 54 carried in the brackets 51, 52. With the foregoing construction, the hopper 18 may conveniently be positioned upon the plate 55 with the border ring 48 of the former in abutment with the upper face of the plate. For the purpose of maintaining this abutting relationship and preventing accidental lifting of the hopper, any suitable disengageable clamping means may be employed such, for example, as a detachable hook 59 which is adapted to engage the eye of an upwardly projecting tab 60 mounted on the brackets 40 of the boot.

Circumferentially enclosed by the border ring 48 of the hopper and disposed in concentric bearing engagement with the face of the false plate 55 is a seed plate annulus 61 (Figs. 2, 3) of slightly crowned contour. The latter is fashioned with a series of peripheral cells 62 which underlie the segmental marginal openings 50 in the hopper bottom and are adapted to receive seeds from the hopper 18. Upon rotation of the seed plate 61, its cells 62 register sequentially with an aperture or port 64 in the false plate, permitting seeds to drop therethrough and into an underlying seed tube 65 housed within the boot 17. To insure that only one seed at a time will be fed to the tube 65, a knocker 66 of well known form is mounted on the hopper bottom 49 and in operative engagement with the seed plate 61.

As heretofore indicated, power for driving the seed dispensing mechanism 19 is obtained from the press wheel 21. In the illustrative embodiment of the invention, a belt drive is employed for this purpose, the tension in the belt being regulated by the use of suitable tension adjusting means 68 (see Fig. 1). Unitary with the hub of the press wheel 21 is a driving pulley 69, the diameter of which may be adjusted to vary the speed at which the seed dispensing mechanism 19 is driven. Power from the pulley 69 is transmitted via a belt 70 to a driven pulley 71 rigidly fixed to a transverse drive shaft 72 (refer to Fig. 4). The latter is journaled in bearings 73 associated with the gear box 57 which is adapted to be filled with an appropriate lubricant. In order to prevent the escape of excessive quantities of lubricant from the gear box 57, sealing washers 74 may be mounted on the shaft 72 in close proximity to the bearings 73. Pinned or otherwise secured to the shaft 72 at a point just inside the gear box 57, is a pinion 75 having teeth which drivingly mesh with the teeth of a crown gear 76. The latter is formed with a depending central boss 77 terminating in a downwardly extending centering stem 78. The stem 78 is journaled in a bushing 79 which is unitary with an upstanding bracket 80 fixed to the floor of the gear case so as to straddle the drive shaft 72. The upper peripheral portion of the crown gear 76 is fashioned with a contour having a complemental relationship with the surrounding wall portion of the gear case and is of suitable size to constitute a comfortable rotating fit therewith. Disposed in a circumferentially spaced pattern on the upper face of the crown gear 76 are a plurality of upstanding driving lugs 81 unitary with the former. The upper portion of the gear case may be sealed against the entry of foreign matter by means of a rotatable annular dust cap 82 fixed to the crown gear 76 as by machine screw 83 and provided with suitably spaced apertures through which the upstanding driving lugs 81 project.

Figure 4:
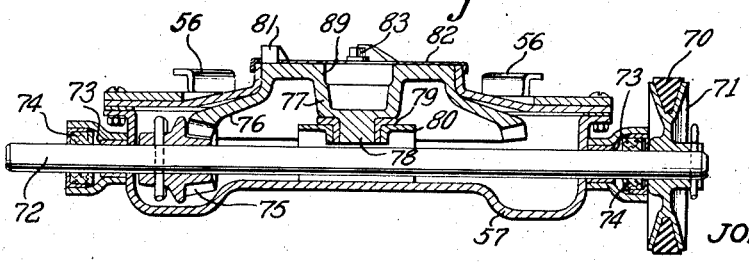
Fig. 4 is an enlarged vertical sectional view taken in the plane of line 4—4 of Fig. 2 through the gear box of the dispensing mechanism drive.

For the purpose of transmitting power between the seed plate 61 and the upper portion of the crown gear 76, such portion actually constituting a driving head, an intermediate drive member 84 is used (Figs. 2 and 3). The member 84 in the present instance is formed with a number of radial spokes 85 and is journaled for free rotation upon a centering pin or stub shaft 86. As shown, such pin is of axially hollow construction and is bolted rigidly to the hopper bottom 49 by a longitudinal bolt 86A which holds the upper end of the pin lodged in a central conical recess 87 in the hopper bottom. The hub of the drive member 84 is formed on its underside with a depending boss 88 of proper size to fit comfortably into a guiding or centering recess 89 located within the head of the gear 76 and concentric with the centering stem 78 thereof (Fig. 4). As shown, the pin retaining bolt 86A depends below the boss 88 to connect with an enlarged abutment having axial engagement with the lower end of the boss. In the present instance, an enlarged head 86B is formed on the lower end of the bolt to engage a washer 86C interposed between the bolt head and the boss. Thus, the bolt 86A, together with the head 86B and washer 86C, form axial retaining means for supporting the drive member 84 from the transverse support 49 on the hopper 18. The member 84 is also fashioned with a plurality of lugs 90 extending downwardly and into the rotational path of the lugs 81 on the crown gear to form a driving connection therewith, the consequent driving engagement between the lugs 81 and 90 producing rotation of such member. The spokes 85 of the member 84 are of equal radial dimension, their ends extending into abutment with the inner periphery of the annular seed plate 61. The inner periphery of the plate 61 is formed with a plurality of driven lugs 91 which are adapted to be engaged by complemental lugs 92 unitary with the spokes 85 and located adjacent their outer extremities. This constitutes a positive driving connection between the member 84 and the seed plate 61.

With the arrangement described, it is possible to control and transmit power efficiently from the press wheel 21 to the seed plate 61. Furthermore, all unnecessary friction in the drive is completely eliminated, thereby minimizing wear on the moving parts. While the latter are precisely centered when the drive is operating, it is possible to lift the hopper and its associated parts and immediately restore them to operating position without disturbing the centering arrangement. It will be appreciated that upon upward pivotal movement of the hopper 18 the intermediate drive member 84 is lifted by the bolt 86A out of interconnecting engagement with the crown gear 76 and the seed plate 61. Upon return of the hopper 18 to operative position, the intermediate drive member is automatically lowered into engagement with its coacting working elements. On the other hand, it is possible to disassemble the drive, quickly substitute a different seed plate for the one previously used, and then to reassemble the drive perfectly centered without having to make a special adjustment for this purpose.

I claim as my invention:

1. In a seed planter a seed dispensing assembly comprising, in combination, a rotary mechanism for dispensing seed in timed relation to translatory movement of the planter, a seed hopper pivotally mounted adjacent said mechanism for vertical swinging movement between an operative seed supplying position overlying said mechanism and an inoperative position vertically removed from said mechanism for rendering access thereto; said mechanism including a generally horizontal ring-like false plate having a seed discharge port therein; a seed dispensing annulus slidably disposed in overlying relation to said false plate, and a driving pinion rotatably mounted about an axis spaced from said false plate, a driving head concentric with said false plate and rotatably mounted about a generally vertical axis, gear teeth on said head meshing with said pinion, upwardly accessible central guide means on said head concentric with the axis thereof, driving lugs on said head, driving lugs on said seed dispensing annulus, a transverse support member mounted in the lower end of said hopper and movable therewith, journaling means on said support member concentric with the rotary axis of said head, an intermediate driving member rotatably mounted on said journaling means and having first driving lugs thereon complementary to said head lugs and second driving lugs thereon complementary to said seed annulus lugs, and said intermediate member having central guide means on the lower side thereof concentric with said journal means and axially engageable with said driving head guide means to center said intermediate member and said hopper with said driving head.

2. In a seed planter, a seed dispensing assembly comprising, in combination, a rotary mechanism for dispensing seed in timed relation to translatory movement of the planter, a seed hopper pivotally mounted adjacent said mechanism for vertical swinging movement between an operative seed supplying position overlying said mechanism and an inoperative position vertically removed from said mechanism for rendering access thereto, said mechanism including a ring-like false plate having a discharge port therein, a seed dispensing annulus slidably disposed in overlying relation to said false plate, driving lugs on said annulus, and a driving pinion rotatably mounted about an axis spaced from said false plate, a transverse support member mounted in the lower end of said hopper and movable therewith, journaling means on said support member concentric with said false plate and said seed annulus, a disengageable driving member rotatably mounted on said journaling means and having driving lugs thereon complementary to said seed annulus lugs, retaining means connected to said journaling means and having upward axial engagement with said driving member to support the latter from said transverse support member for engagement with said seed plate when said hopper is in operative position and to carry said driving member upwardly out of engagement with said seed plate upon tilting of said hopper to inoperative position, gear means coacting with said driving member to connect the latter with said pinion when said hopper is in operative position, and centrally disposed interconnecting means on said drive member and said gear means for maintaining the latter in alinement with said drive member and said hopper.

JOHN T. MURPHY.

References Cited in the file of this patent

UNITED STATES PATENTS

| Number | Name | Date |
|---|---|---|
| 610,771 | Schofield | Sept. 13, 1898 |
| 873,708 | Bering et al. | Dec. 17, 1907 |
| 1,001,367 | Dennis | Aug. 22, 1911 |
| 1,016,766 | Packham | Feb. 6, 1912 |
| 1,030,331 | Ruel et al. | June 25, 1912 |
| 1,062,449 | Ford | May 20, 1913 |
| 1,174,130 | Dooley | Mar. 7, 1916 |
| 1,189,718 | Michael et al. | July 4, 1916 |
| 1,195,483 | Lindgren | Aug. 22, 1916 |
| 1,236,519 | White | Aug. 14, 1917 |
| 1,265,323 | Graham | May 7, 1918 |
| 1,282,648 | Smith | Oct. 22, 1918 |
| 1,512,256 | White | Oct. 21, 1924 |
| 1,677,469 | Dennis | July 17, 1928 |
| 1,944,381 | Wamhoff | Jan. 23, 1934 |